No. 645,518. Patented Mar. 13, 1900.
W. WATT.
TREE PROTECTOR.
(Application filed Dec. 30, 1898. Renewed Jan. 15, 1900.)
(No Model.) 2 Sheets—Sheet 1.
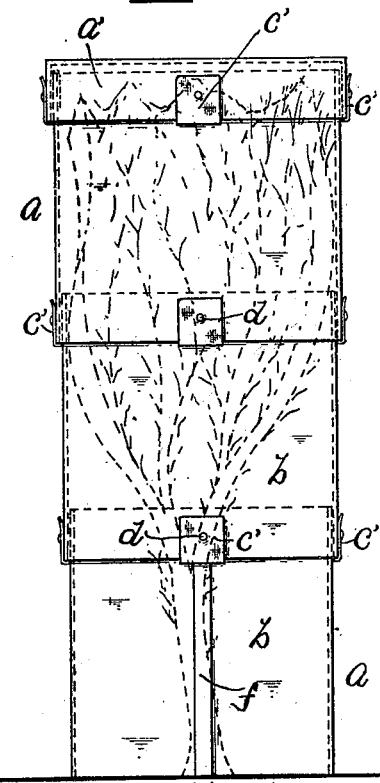
Fig. 1.
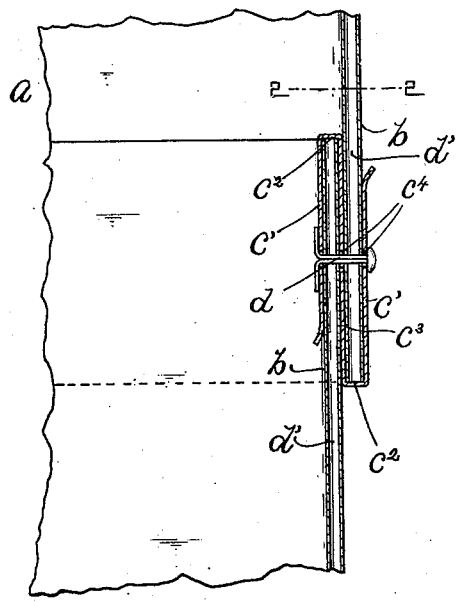
Fig. 2.
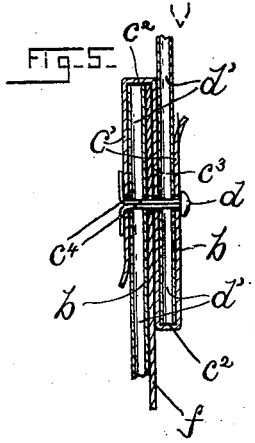
Fig. 5.
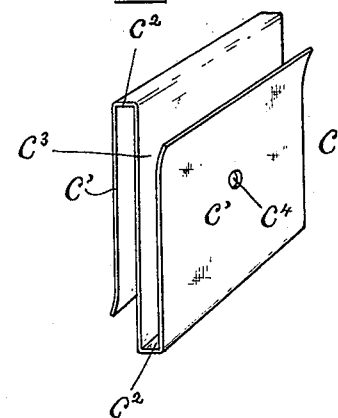
Fig. 4.
Fig. 3.
WITNESSES
INVENTOR,
William Watt,
BY
Frank H. Allen
ATTORNEY.

No. 645,518. Patented Mar. 13, 1900.
W. WATT.
TREE PROTECTOR.
(Application filed Dec. 30, 1898. Renewed Jan. 15, 1900.)
(No Model.) 2 Sheets—Sheet 2.
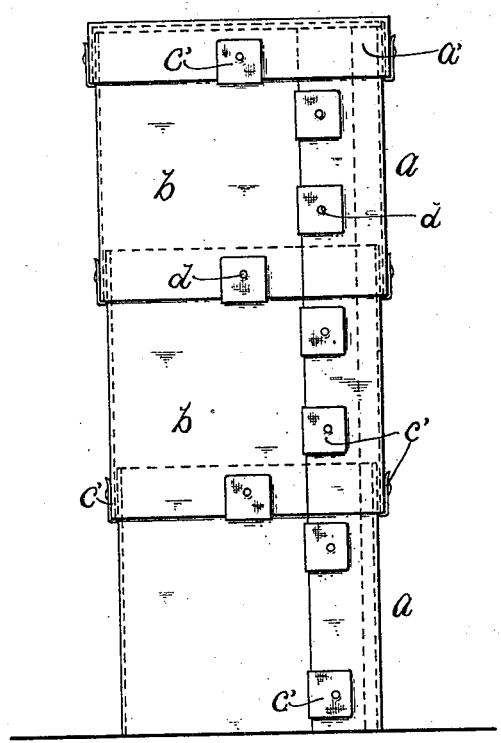
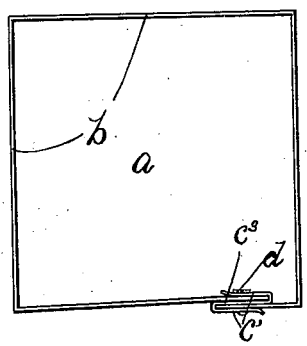
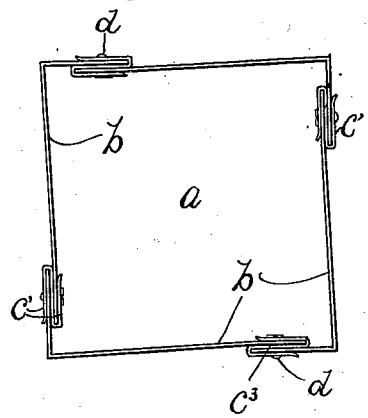
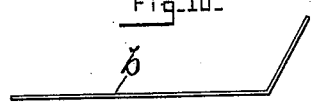
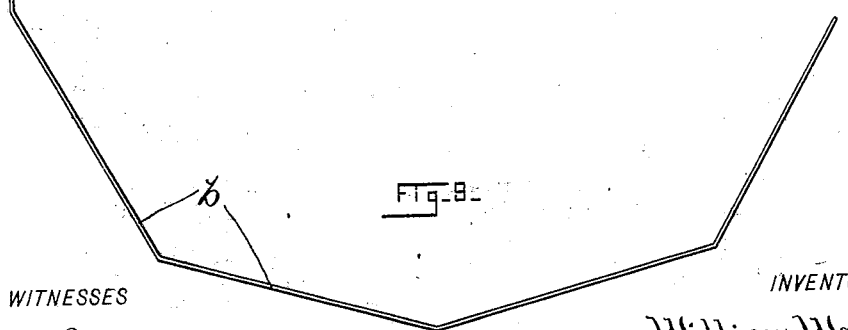
WITNESSES
INVENTOR,
William Watt,
BY
Frank H. Allen
ATTORNEY.

UNITED STATES PATENT OFFICE.

WILLIAM WATT, OF BOSTON, MASSACHUSETTS, ASSIGNOR TO THE THOMPSON & NORRIS COMPANY, OF NEW YORK, N. Y.

TREE-PROTECTOR.

SPECIFICATION forming part of Letters Patent No. 645,518, dated March 13, 1900.

Application filed December 30, 1898. Renewed January 15, 1900. Serial No. 1,541. (No model.)

*To all whom it may concern:*

Be it known that I, WILLIAM WATT, a citizen of the United States, residing at Boston, Suffolk county, State of Massachusetts, have invented certain new and useful Improvements in Tree-Protectors, of which the following is a full, clear, and exact description.

This invention is in tree-protectors, and has for its object the production of a device for the protection of plants and small trees (particularly orange-trees) from frosts, which device shall embody simplicity and lightness in its construction, shall be capable of being "knocked down" for convenience in shipping, and which shall be reasonably inexpensive.

My said invention, briefly described, consists of a housing made up, as here shown, of telescoping vertical box-sections and a horizontal cap or cover section, all being secured together by a novel fastening device. The number and size of sections employed are dependent upon the size of the plant or tree to be inclosed, and the upper one thereof is adapted to receive a cap-section, like a box-cover, to complete the housing of the said plant or tree. A feature of my newly-invented device consists in producing the said sections preferably from peculiarly-constructed paper-stock, by means of which ventilation is secured within said device, as hereinafter fully described.

To assist in explaining my invention, I have provided the accompanying sheets of drawings, which serve to illustrate the same, as follows:

Figure 1 shows in elevation my newly-invented protector and in dotted lines a plant or small tree inclosed therein. Fig. 2 illustrates, on a somewhat-enlarged scale, the manner in which the sections composing the protector are secured together. Fig. 3 is a cross-sectional view taken on the line 2 2, looking down upon the fastening device. Fig. 4 is a perspective view of the said fastening device, illustrating the manner in which the telescoping sections are secured together, said fastening device being employed also in the construction of the said sections. Fig. 5 is a view similar to Fig. 1, but illustrates also means whereby my newly-invented protector may be anchored in a desired position. Fig. 6 is an elevation of my protector and shows particularly the manner of constructing the sections. Fig. 7 is a plan view of one of the sections, illustrating still further the manner of its construction. Fig. 8 is a view similar to Fig. 7, but shows a modification in the construction of the sections. Figs. 9 and 10 explain how the sections shown in Figs. 7 and 8 may be opened and flattened for convenience in packing and shipping.

Referring to the drawings, the letter $a$ denotes as a whole the sections of which my protector is made up, said sections being of box form when assembled and set up and having preferably four sides $b$, but having neither top nor bottom. The sections $a$ employed in thus making up a protector are adapted to be assembled one above the other, and they are of such sizes relatively to each other that in assembling as just stated the lower end of each section (excepting the bottom one resting upon the ground) incloses and overlaps the upper end of the adjoining section, the several sections telescoping into each other, as shown in Figs. 1 and 6.

To prevent each section $a$ from overlapping its adjacent lower section too far and to retain such adjacent sections in a given position relative to each other, I have provided a novel fastening device. (Best shown in Fig. 4 of the drawings.) Said device (denoted as a whole by the letter $c$) consists of a sheet-metal strip whose ends $c'$ are respectively doubled upon the main portion $c$ adjacent to the opposite faces of the latter. The device thus produced forms a doubly-recurved clip or double hook, of which the hooks proper are denoted by the reference-letter $c^2$. In assembling the sections $a$ of a protector one of the fastenings $c$ is hooked over the upper edge of each wall of each section substantially midway the length of said walls. The lower hook $c^2$ of the clip $c$ lies outside the section to which said clip is secured, and said last-named hook receives the lower edge of the adjacent overlapping upper section, thereby limiting the amount of such overlapping to the distance between the hooks $c^2$ of the clip. When two sections are assembled, as just described, the main portion $c^3$ of the fastening device lies between the adjacent faces of the overlapping walls, as will be readily understood from the drawings. To retain the sections in the positions just mentioned, I have provided in the portions $c'$ $c^3$ of each double-hook fastening $c$ a substantially centrally-located hole $c^4$, said holes being in alinement with each other and adapted to receive a pin $d$, passed therethrough and through the overlapping walls of the sections. To prevent the accidental displacement of said pin, its inner end is preferably clenched, as shown, thus locking the sections and the fastener securely together.

The cover or horizontal section $a'$ of my protector is substantially like an ordinary box-cover and is of sufficient size to readily fit over the upper end of the top section $a$, and, if desired, it may be secured by the fasteners $c$.

In Figs. 6 and 7 the vertical sections $a$ are shown as formed of a single strip of material folded to form the four sides $b$ and having its ends overlapping and secured by fasteners $c$, the latter being employed in the manner already explained.

In Fig. 8 a modification is shown in the manner of constructing the vertical sections $a$, consisting in making up said sections of a number of pieces whose adjacent ends overlap and are secured by the clips $c$.

The sections $a$ being constructed as shown in Figs. 6, 7, and 8, it will be seen, can be readily unfolded for flat shipment, as understood by reference to Figs. 9 and 10, which show the sections as in the act of being opened out and flattened.

The sections $a$ are preferably formed of a peculiarly-constructed paper-stock. (Shown in Figs. 2, 3, and 5.) Said stock consists of corrugated or crimped paper $d'$, having on each side a flat web of paper forming the opposite or exposed faces of the walls $b$ of the sections $a$. The corrugations just mentioned are adapted to extend vertically when the sections $a$ are in position, thus providing passages through which currents of air entering the lower edge of the sections $a$ pass downward into the interior of the protector, and thus effect the ventilation thereof.

The described stock while being very light is also very stiff and of considerable thickness, is easily bent up at the desired points, and in every way is well suited for the purpose in question.

If desired, the protector may be anchored by one or more strips $f$, the upper end of each strip being received between the outer face of the section-wall $b$ and the adjacent main portion $c$ of one of the fastening devices and the pin $d$ passing through said end, as shown in Fig. 5. The lower end of the anchor $f$ enters the ground, as here shown, and thus securely holds the protector in position.

In utilizing my device with a small plant or tree a protector of the desired size may be first made up and then passed over the tree to cover the same and, if desired, securely anchored, as explained. Should it be desired, however, to cover a large plant whose branches could not be easily drawn together to permit of the placing of the protector thereover, the protector can be as well built up in sections around the plant until a housing of the desired size is produced.

Having thus described my invention, I claim—

A tree-protector comprising a number of superimposed, overlapping tubular sections of sheet material, and a lid of the same, brought together as set forth to form an envelop, and fasteners, for joining the contiguous edges of said sheets, each fastener consisting of a perforated, doubly-recurved, clip, as set forth, and a pin passing through the said clip and also through the sheet material clasped thereby, all combined substantially as specified.

Signed at Norwich, Connecticut, this 22d day of December, 1898.

WILLIAM WATT.

Witnesses:
FRANK H. ALLEN,
ALONZO M. LUTHER.